US008828302B2

(12) United States Patent
Khine et al.

(10) Patent No.: US 8,828,302 B2
(45) Date of Patent: Sep. 9, 2014

(54) PREPARATION AND USE OF NANOWRINKLES (75) Inventors: Michelle Khine, Irvine, CA (US); Cheng-Wei Aaron Chen, Irvine, CA (US); Wendy Liu, Irvine, CA (US); Tingting Wang, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/367,317

(22) Filed: Feb. 6, 2012

(65) Prior Publication Data
US 2012/0200008 A1 Aug. 9, 2012

Related U.S. Application Data (60) Provisional application No. 61/440,356, filed on Feb. 7, 2011.

(51) Int. Cl.
B29C 61/02 (2006.01)
B29C 59/14 (2006.01)

(52) U.S. Cl.
CPC ........ B29C 59/14 (2013.01); *B01J 2219/00635* (2013.01); *B01J 2219/00743* (2013.01); *B01J 2219/0061* (2013.01); *B01J 2219/0074* (2013.01); B29C 61/02 (2013.01)
USPC ...................... 264/342 R; 264/483

(58) Field of Classification Search
USPC ................... 264/289.6, 342 R, 483
See application file for complete search history.

(56) References Cited

U.S. PATENT DOCUMENTS

| 4,470,415 | A | * | 9/1984 | Wozniak ........................ 606/149 |
| 4,596,728 | A | * | 6/1986 | Yang et al. .................... 428/35.1 |
| 5,079,273 | A | * | 1/1992 | Kuroda et al. ................. 521/139 |
| 5,418,136 | A | | 5/1995 | Miller et al. |
| 6,376,619 | B1 | | 4/2002 | Halverson et al. |
| 6,395,483 | B1 | | 5/2002 | Patil et al. |
| 6,482,638 | B1 | | 11/2002 | Patil et al. |
| 6,548,607 | B2 | | 4/2003 | Halverson et al. |
| 6,573,338 | B2 | | 6/2003 | Halverson et al. |
| 6,593,089 | B2 | | 7/2003 | Patil et al. |
| 6,664,060 | B2 | | 12/2003 | Patil et al. |
| 6,783,838 | B2 | | 8/2004 | Coleman et al. |
| 6,841,258 | B2 | | 1/2005 | Halverson et al. |
| 6,881,538 | B1 | | 4/2005 | Haddad et al. |
| 6,913,931 | B2 | | 7/2005 | Halverson et al. |

(Continued)

FOREIGN PATENT DOCUMENTS

WO  WO 2009/064816 A1   5/2009
WO  WO2009064816    *  5/2009

(Continued)

OTHER PUBLICATIONS

Chao, Carlson, and Meldrum, Rapid fabrication of microchannels using microscale plasma actived templating generated water molds, Lab Chip (2007), vol. 7, pp. 641-643.*

(Continued)

*Primary Examiner* — Matthew Daniels
(74) *Attorney, Agent, or Firm* — Foley & Lardner LLP; Antoinette F. Konski (57) ABSTRACT

Provided are methods of preparing a textured surface on a thermoplastic material that include treating the material with a plasma and subsequently shrinking the substrate to induce formation of textures.

7 Claims, 8 Drawing Sheets

(56) References Cited

U.S. PATENT DOCUMENTS

| | | | |
|---|---|---|---|
| 7,033,667 | B2 | 4/2006 | Voss-Kehl et al. |
| 7,189,842 | B2 | 3/2007 | Halverson et al. |
| 2002/0146745 | A1 | 10/2002 | Natan et al. |
| 2003/0180191 | A1 | 9/2003 | Suzuki et al. |
| 2011/0122406 | A1 | 5/2011 | Khine et al. |
| 2012/0027807 | A1 | 2/2012 | Chien et al. |
| 2012/0064627 | A1 | 3/2012 | Khine et al. |
| 2012/0129208 | A1 | 5/2012 | Khine et al. |
| 2012/0129209 | A1 | 5/2012 | Khine et al. |
| 2012/0202702 | A1 | 8/2012 | Khine et al. |
| 2013/0040335 | A1 | 2/2013 | Khine et al. |
| 2013/0101795 | A1 | 4/2013 | Khine et al. |
| 2013/0309450 | A1 | 11/2013 | Khine et al. |

FOREIGN PATENT DOCUMENTS

| | | |
|---|---|---|
| WO | WO 2010/085751 A2 | 7/2010 |
| WO | WO 2010/108025 A2 | 9/2010 |
| WO | WO 2010/132610 | 11/2010 |
| WO | WO 2010/132611 | 11/2010 |
| WO | WO 2010/132612 | 11/2010 |
| WO | WO 2011/028579 | 3/2011 |
| WO | WO 2012/115658 A1 | 8/2012 |
| WO | WO 2013/063406 | 5/2013 |

OTHER PUBLICATIONS

Junkar, Ita, et al. Influence of oxygen and nitrogen plasma treatment on polyethylene terephthalate (PET) polymers, Vacuum, vol. 84 (2009), pp. 83-85.*

Chen et al., "Geometric Control of Cell Life and Death," Science 276: 1425-1428 (1997).

Coyne et al., "A Simple Method for Derivatizing the Surface of Silica Gel with Aldehyde Groups by Employing a New Alkoxy Aldehyde Silane," UCT, Inc. pages 1-15 (2008).

Dalby et al., "Nanomechanotransduction and Interphase Nuclear Organization Influence on Genomic Control", J Cell Biochem 102:1234-1244 (2007).

Dalby et al., "Nucleus alignment and cell signaling in fibroblasts: response to a micro-grooved topography", Exp Cell Res 284:274-282 (2003).

Dalby et al., "The control of human mesenchymal cell differentiation using nanoscale symmetry and disorder", Nat Mater 6: 997-1003 (2007).

Efimenko et al., "Development and Testing of Hierarchically Wrinkled Coatings for Marine Antifouling", ACS Appl Mater Interfaces 1(5): 1031-1040 (2009).

Engelmayr et al., "Accordion-like honeycombs for tissue engineering of cardiac anisotropy", Nat Mater 7: 1003-1010 (2008).

Fu et al., "Tunable Nanowrinkles on Shape Memory Polymer Sheets", Advanced Materials 21:4472-4476 (2009).

Gerecht et al., "The effect of actin disrupting agents on contact guidance of human embryonic stem cells", Biomaterials 28: 4068-4077 (2007).

Kim et al., "Nanoscale cues regulate the structure and function of macroscopic cardiac tissue constructs", Proc Natl Acad Sci 107(2): 565-570 (2010).

McBeath et al., "Cell Shape, Cytoskeletal Tension, and RhoA Regulate Stem Cell Lineage Commitment", Developmental Cell 6: 483-495 (2004).

McNamara et al., "Nanotopographical Control of Stem Cell Differentiation", Journal of Tissue Engineering pp. 1-13 (2010).

Nathan et al., "Mechano-topographic modulation of stem cell nuclear shape on nanofibrous scaffolds", Acta Biomaterialia 7: 57-66 (2011).

Pajerowski et al., "Physical plasticity of the nucleus in stem cell differentiation", Proc. Natl. Acad. Sci. 104(40): 15619-15624 (2007).

Pins et al., "Self-Assembly of Collagen Fibers. Influence of Fibrillar Alignment and Decorinon Mechanical Properties", Biophysical Journal 73: 2164-2172 (1997).

Thomson et al., "Embryonic Stem Cell Lines Derived from Human Blastocysts", Science 282: 1145-1147 (1998).

Van Der Meer et al., "Analyzing shear stress-induced alignment of actin filaments in endothelial cells with a microfluidic assay", Biomicrofluidics, 4: pp. 011103-1 to 011103-5, (2010).

Watt et al., "Cell shape controls terminal differentiation of human epidermal keratinocytes", Proc. Natl. Acad. Sci. 85:5576-5580 (1988).

Yim et al., "Nanotopography-induced changes in focal adhesions, cytoskeletal organization, and mechanical properties of human mesenchymal stem cells", Biomaterials 31: 1299-1306 (2010).

Au et al., "Cell culture chips for simultaneous application of topographical and electrical cues enhance phenotype of cardiomyocytes", Lab Chip 9: 564-575 (2009).

Au et al., "Interactive effects of surface topography and pulsatile electrical B01eld stimulation on orientation and elongation of B01broblasts and cardiomyocytes", Biomaterials 28: 4277-4293 (2007).

Bettinger et al., "Engineering Substrate Topography at the Micro- and Nanoscale to Control Cell Function," Angew Chem Int Ed Engl 48:54065415 (2009).

Bowden et al., "Spontaneous formation of ordered structures in thin films of etal supported on an elastomeric polymer", Nature 393:146-149 (1998).

Engler et al., "Matrix Elasticity Directs Stem Cell Lineage Specification", Cell 126: 677-689 (2006).

Formstein, et al., "Seeding Bioreactor-Produced Embryonic Stem Cell-Derived Cardiomyocytes on Different Porous, Degradable Polyurethane Scaffolds Reveals the Effect of Scaffold Architecture on Cell Morphology". Tissue Engineering, 14(3): 369-378, 2008.

Jiang et al., "Controlling Mammalian Cell Spreading and Cytoskeletal Arrangement with Conveniently Fabricated Continuous Wavy Features on Poly(dimethylsiloxane)", Langmuir 18: 3273-3280 (2002).

Laflamme et al., "Cardiomyocytes derived from human embryonic stem cells in pro-survival factors enhance function of infarcted rat hearts", Nat Biotechnol 25(9): 1015-1024 (2007).

Lam et al., "Reversible on-demand cell alignment using reconfigurable microtopography", Biomaterials 29: 1705-1712 (2008).

Luna et al., "Multiscale Biomimetic Topography for the Alignment of Neonatal and Embryonic Stem Cell-Derived Heart Cells", Tissue Engineering (Part C) 17(5): 579-588 (2011).

Mandon et al., "Polyshrink (TM) based microfluidic chips and protein microarrays", Biosensors and Bioelectronics 26: 1218-1224 (2010).

Murtuza et al., "Micro- and Nanoscale Control of the Cardiac Stem Cell Niche for Tissue Fabrication", Tissue Eng (Part B) 15(4):443-454 (2009).

Nguyen et al., "Better shrinkage than Shrinky-Dinks", Lab Chip 10: 1623-1626 (2010).

Pagliari et al., "Cooperation of Biological and Mechanical Signals in Cardiac Progenitor Cell Differentiation", Adv. Mater. 23: 514-518 (2011).

Soliman et al., "Multiscale three-dimensional scaffolds for soft tissue engineering via multimodal electrospinning", Acta Biomaterialia 6: 1227-1237 (2010).

Stevens et al., "Physiological function and transplantation of scaffold-free and vascularized human cardiac muscle tissue", Proc. Natl. Acad. Sci. 106(39): 16568-16573 (2009).

Tan et al., "Bionanotechnology based on Silica Nanoparticles", Medicinal Research Reviews, 24(5):621-638 (2004).

Taylor et al., "Shrink film patterning by craft cutter: complete plastic chips with high resolution/high-aspect ratio channel", Lab Chip 10: 2472-2475 (2010).

Tessier et al., "Improved surface sensing of DNA on gas-etched porous silicon", Sensors and Actuators B 120: 220-230 (2006).

Volle et al., "Enhanced sensitivity detection of protein immobilization by fluorescent interference on oxidized silicon", Biosensors and Bioelectronics 19: 457-464 (2003).

(56) References Cited

OTHER PUBLICATIONS

Xu et al., "Feeder-free growth of undifferentiated human embryonic stem cells", Nat. Biotechnol, 19:971-974 (2001).

Xue et al., "Functional Integration of Electrically Active Cardiac Derivatives From Genetically Engineered Human Embryonic Stem Cells With Quiescent Recipient Ventricular Cardiomyocytes: Insights Into the Development of Cell-Based Pacemakers", Circulation 111:11-20 (2005).

Yang et al., "Human cardiovascular progenitor cells develop from a KDR1 embryonic-stem-cell-derived population", Nature 453: 524-529 (2008).

Zheng et al., "Silica colloidal crystals for enhanced fluorescence detection in microarrays", Anal. Chem. 79:3867-3872 (2007).

Chen, A. et al. "Shrink-Film Configurable Multiscale Wrinkles For Functional Alignment of Human Embryonic Stem Cells and their Cardiac Derivatives," Advanced Materials, 23:5785-5791, (Nov. 8, 2011).

* cited by examiner

PREPARATION AND USE OF NANOWRINKLES

CROSS REFERENCE TO RELATED APPLICATIONS

This application claims the benefit under 35 U.S.C. §119 (e) of U.S. Provisional Application Ser. No. 61/440,356 filed Feb. 7, 2011, the content of which is incorporated by reference in its entirety.

FIELD OF THE DISCLOSURE

The invention disclosed herein generally relates to the field of microfabrication of nanowrinkles and culturing of cells with microfabricated surfaces having nanowrinkles

BACKGROUND

Studies of cellular responses to topographies ranging from nano to micro scales are of great importance to fundamental cell biology as well as to applications in stem cell biology and tissue engineering. Leveraging traditional fabrication techniques originally developed for the semiconductor industry, researchers have been able to precisely control the topographical features of in vitro substrata to better understand the interaction between cells and their microenvironments. Previous studies have demonstrated the phenomenon of contact guidance, directed alignment and migration along lines of topographic anisotropy, using a variety of cells—from myocytes to adult stem cells—with a range of responses. For example, the effects of contact guidance have been shown to induce cytoskeletal rearrangement, nuclear deformation and gene expression changes in fibroblasts and even terminal differentiation in keratinocytes.

While it has been shown that cellular response to biophysical cues of various length scales are markedly different from a mechanistic as well as a phenotypic perspective, the majority of currently available fabricated topographies have simple and repetitive patterns of grooves or ridges of either a homogenous size or of a narrow size range at either the micro-, or more recently, the nano-scale. Although such designs are helpful in studying a controlled cellular behavior, they do not represent the physiological conditions of native tissue necessary for tissue engineering. Nature's ordering is dramatically different than the precisely periodic arrays produced from high precision fabrication approaches. In vivo, the organization of the extracellular matrix (ECM) varies dramatically in its structural arrangement, content, texture, and fiber bundle thickness. For example, collagen, the main structural component in ECM, form self-similar fibrils (20-100s of nms) which in turn form bundles and fibers across several orders of magnitude.

While cells in vivo experience topographies with features across a vast size range, physiologically comparable cellular environments with length scales that span several orders of magnitude have not been readily simulated by precision micro- or nano-fabrication techniques. Achieving this engineering feat typically relies on substantial capital equipment and/or engineering expertise for fabrication limiting their accessibility to biological laboratories.

Microfabrication techniques were originally developed for the microelectronic industry, researchers have been able to create simple designs such as well-defined and repetitive patterns of grooves, ridges, pits, and waves. Techniques such as photolithography, electron-beam lithography, colloidal lithography, electrospinning, and nanoimprinting are popular methods for fabricating micro and nano topographical features. The need for large capital investments and engineering expertise has prevented the widespread use of these fabrication methods in common biological laboratories.

SUMMARY

It is discovered herein that plasma treatment of a thermoplastic material, such as a polyethylene (PE) film, creates a stiff layer at the surface of a relatively softer bulk PE. Leveraging the inherent retraction properties of the thermoplastic material at elevated temperature, the mismatch in stiffness between two layers will cause the stiff outer layer to buckle and form controllable textures or wrinkles. Accordingly, the present disclosure provides an ultra-rapid, tunable, robust, facile, and inexpensive fabrication method to create multiscaled self-similar alignment grooves ranging from nano- to micrometers as biomimetic cell culture substrates.

Thermoplastic materials, such as PE, are widely used in biomedical applications such as implants and as a supporting material for cell growth. However, untreated thermoplastic material generally have a low surface free energy which is not ideal for cell attachment. Plasma treatment increases surface free energy; hence it promotes cell attachment.

Another benefit of plasma treatment of thermoplastic materials is that the plasma treatment preserves subsurface composition and properties while only affecting the outermost surface layer of the thermoplastic materials.

Therefore, the present disclosure provides a rapid, robust, and inexpensive fabrication method to create multiscaled textures having groves ranging from micron to nanometer as biomimetic cell culture substrates. The entire process only takes few minutes, and this method alleviates the need for significant capital investment. Moreover, by changing the plasma treatment time and shrinking process, the size of nanotextures and nanowrinkles can be tuned.

Thus, one embodiment of the present disclosure provides a method for preparing a textured surface, comprising shrinking a thermoplastic material, thereby preparing a textured surface on the material, wherein the material has been treated by a plasma. In one aspect, the plasma is oxygen plasma.

The material can be pre-stressed prior to the plasma treatment. When the material is prestressed, the shrinking can be achieved by removing the stress. In another aspect, the shrinking is achieved by heating the material, whether the material has been prestressed.

In some aspects, the shrinking is uniaxial or biaxial. In some aspects, the material is shrunk by at least 60% or more.

Thermoplastic materials suitable for practicing the present technology include, without limitation, a high molecular weight polymer, polyolefin, polyethylene, acrylonitrile butadiene styrene (ABS), acrylic, celluloid, cellulose acetate, ethylene-vinyl acetate (EVA), ethylene vinyl alcohol (EVAL), fluoroplastics (PTFEs, including FEP, PFA, CTFE, ECTFE, ETFE), ionomers kydex, a trademarked acrylic/PVC alloy, liquid crystal polymer (LCP), polyacetal (POM or Acetal), polyacrylates (Acrylic), polyacrylonitrile (PAN or Acrylonitrile), polyamide (PA or Nylon), polyamide-imide (PAI), polyaryletherketone (PAEK or Ketone), polybutadiene (PBD), polybutylene (PB), polybutylene terephthalate (PBT), polyethylene terephthalate (PET), Polycyclohexylene Dimethylene Terephthalate (PCT), polycarbonate (PC), polyhydroxyalkanoates (PHAs), polyketone (PK), polyester polyethylene (PE), polyetheretherketone (PEEK), polyetherimide (PEI), polyethersulfone (PES), polysulfone polyethylenechlorinates (PEC), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polyvinyl chloride (PVC), polyvinylidene chloride (PVDC) or spectralon. In one aspect, the thermoplastic material comprises polyolefin. In another aspect, the thermoplastic material comprises polyethylene.

Also provided is a substrate having a textured surface prepared by a method of any one of above embodiments.

The present disclosure also provides a method for growing cells comprising placing a cell on a substrate having a textured surface, wherein the textured surface is prepared by a method of any of the above embodiments. In one aspect, the method further comprises removing the cells from the substrate. Still further provided is a population of cells produced by the this method.

It is also discovered that macrophage cells, when placed on one-dimensional nanowrinkles, the macrophages can be activated. Such activation is evidenced by upregulated arginase expression, reduced secretion of the pro-inflammatory cytokine, tumor necrosis factor-α (TNF-α) and increased secretion of pro-healing cytokines including IL-10 and TGF-β.

Such activation of macrophages, additionally, does not require addition of exogenous cytokines Therefore, the disclosure provides methods of preparing activated macrophages which are useful for would healing, among other uses.

Accordingly, another embodiment of the present disclosure provides a method for activating a microphage comprising placing a macrophage on a surface having a substantially one-dimensional texture, thereby activating the macrophage. In some aspects, the surface is prepared with methods of the present disclosure that entails plasma treatment. In a particular aspect, the shrinking after plasma treatment is uniaxial.

BRIEF DESCRIPTION OF THE FIGURES

FIG. 1A-E graphically illustrates the process of one embodiment of the method for preparing a textured surface on a polyethylene substrate.

FIG. 4a-b show alignment of stem cells on formed wrinkles (a) Subcellular alignment as indicated by time lapse actin (red) and nuclei (blue) alignment over 72 hours (bar graph, mean±s.d., n=9 images per time point). Control, c, represents cells grown on glass coverslip, and it is an average of all controls from all time points (n=81 images). (b) Nuclear deformation as indicated by nuclear area (left axis of graph, solid line) and circularity (right axis of graph, dash line) as compared to other cell types including AoSMCs and MEFs. Bar graph represents mean±s.d., n=9 images (>300 nuclei) per time point, and * p<0.001 and ** p<0.01.

FIG. 5a-b are SEM pictures with progressive zooms of 1,000×, 5,000×, and 10,000× illustrating the self-similar wrinkles for (a) P1 and (b) P15 condition. The bundling of the wrinkles is apparent.

FIG. 8a-c include immunoflorescence staining images (A), and Western blot gel pictures (B) and charts (C) to show that bone marrow derived macrophage cells seeded on wrinkled surfaces display upregulated arginase expression as measured by immunofluorescence staining (A) and Western blot (B and C) without the addition of exogenous cytokines (B) also shows that Arginase is upregulated by immunosuppressive/pro-healing cytokines IL4/IL13.

DETAILED DESCRIPTION

Definitions

As used herein, certain terms may have the following defined meanings

As used in the specification and claims, the singular form "a," "an" and "the" include plural references unless the context clearly dictates otherwise.

As used herein, the term "comprising" is intended to mean that the compositions and methods include the recited elements, but do not exclude others. "Consisting essentially of" when used to define compositions and methods, shall mean excluding other elements of any essential significance to the combination when used for the intended purpose. Thus, a composition consisting essentially of the elements as defined herein would not exclude trace contaminants or inert carriers. "Consisting of" shall mean excluding more than trace elements of other ingredients and substantial method steps for preparing the intended device. Embodiments defined by each of these transition terms are within the scope of this invention.

All numerical designations, e.g., pH, temperature, time, concentration, and molecular weight, including ranges, are approximations which are varied (+) or (−) by increments of 0.1. It is to be understood, although not always explicitly stated that all numerical designations are preceded by the term "about". It also is to be understood, although not always explicitly stated, that the reagents described herein are merely exemplary and that equivalents of such are known in the art.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

A "thermoplastic material" is intended to mean a plastic material which shrinks upon heating or upon release of pre-stress such as a stress created by stretching. In one aspect, the thermoplastic materials are those which shrink uniformly without distortion. The shrinking can be either bi-axially (isotropic) or uni-axial (anisotropic). Suitable thermoplastic materials for inclusion in the methods of this invention include, for example, polyolefin, polyethylene, high molecular weight polymers such as acrylonitrile butadiene styrene (ABS), acrylic, celluloid, cellulose acetate, ethylene-vinyl acetate (EVA), ethylene vinyl alcohol (EVAL), fluoroplastics (PTFEs, including FEP, PFA, CTFE, ECTFE, ETFE), ionomers kydex, a trademarked acrylic/PVC alloy, liquid crystal polymer (LCP), polyacetal (POM or Acetal), polyacrylates (Acrylic), polyacrylonitrile (PAN or Acrylonitrile), polyamide (PA or Nylon), polyamide-imide (PAI), polyaryletherketone (PAEK or Ketone), polybutadiene (PBD), polybutylene (PB), polybutylene terephthalate (PBT), polyethylene terephthalate (PET), Polycyclohexylene Dimethylene Terephthalate (PCT), polycarbonate (PC), polyhydroxyalkanoates (PHAs), polyketone (PK), polyester polyethylene (PE), polyetheretherketone (PEEK), polyetherimide (PEI), polyethersulfone (PES), polysulfone polyethylenechlorinates (PEC), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polyvinyl chloride (PVC), polyvinylidene chloride (PVDC) and spectralon.

In some aspects, the thermoplastic material encompasses polyolefin. A polyolefin is a polymer produced from a simple olefin (also called an alkene) as a monomer. For example, polyethylene is the polyolefin produced by polymerizing the olefin ethylene. Polypropylene is another common polyolefin which is made from the olefin propylene.

In some aspects, the thermoplastic material encompasses shape memory polymers (SMPs). SMPs are polymeric smart materials that have the ability to return from a deformed state (temporary shape) to their original (permanent) shape induced by an external stimulus (trigger), such as temperature change.

Commercially available thermoplastic materials include, without limitation, "Shrinky-Dink" and porous films such as Solupore®. Shrinky-Dink is a commercial thermoplastic which is used a children's toy. Solupore® is available from Lydall, Inc. of Manchester, Conn.

Methods of Preparing Activated Macrophages

Macrophage cells are central regulators of the immune response to pathogens and wound healing processes. While the role of the soluble microenvironment (cytokines and chemokines) on macrophage phenotype has been studied extensively, the role of the physical environment is not known. It is discovered herein that wrinkled surfaces activate macrophages and induce wound healing responses from macrophages. Such activation is evidenced by upregulated arginase expression, reduced secretion of the pro-inflammatory cytokine, tumor necrosis factor-α (TNF-α) and increased secretion of pro-healing cytokines including IL-10 and TGF-β.

Such activation of macrophages, additionally, does not require addition of exogenous cytokines which are typically required for macrophage activation.

Accordingly, the disclosure provides methods of preparing activated macrophages which are useful for would healing, among other uses. In one aspect, the methods are for activating macrophages that are not yet activated. In another aspect, the methods are for upregulating arginase expression, reducing the secretion of pro-inflammatory cytokines such as tumor necrosis factor-α (TNF-α), and increasing the secretion of pro-healing cytokines including IL-10 and TGF-β.

One embodiment of the present disclosure provides a method for activating a microphage comprising placing a macrophage on a surface having a substantially one-dimensional texture or wrinkle, thereby activating the macrophage.

The term "substantially one-dimensional" as used herein, refers to a texture or a wrinkle that only has up and down roughness at one direction, or where the periodicity of the texture at a first direction is substantially (e.g., at least about 1.5, or 2, 3, 5, 10, 20, 50 or 100 folds) greater than that at a direction perpendicular to the first direction.

In one aspect, the texture has an average height of from about 50 nanometers to about 5 micrometers, or alternatively from about 100 nm to about 3000 nm, or from about 150 nm to about 2000 nm, or from about 200 nm to about 1000 nm. In anther aspect, the average height at not greater than about 500 nm, or 800 nm, or 1000 nm, or 1500 nm, or 2000 nm, or 3000 nm, or 4000 nm, or 5000 nm. In another aspect, the texture has an average height selected from the group consisting of about 200 nanometers, about 300 nanometers, about 500 nanometers, about 700 nanometers, about 1 micrometer, about 2 micrometers, about 3 micrometers, about 4 micrometers, and about 5 micrometers.

In one aspect, the texture has a periodicity (i.e., width) in the range of from about 10 nanometers to about 600 nanometers, or alternatively from about 15 nm to about 500 nm, or from about 20 nm to about 400 nm, or from about 30 nm to about 300 nm, or from about 40 nm to about 200 nm, or from about 50 nm to about 100 nm, or at least about 10 nm, 20 nm, 30 nm, 40 nm, 50 nm, 100 nm, 150 nm, 200 nm, 300 nm, or 400 nm, or less than about 50 nm, 60 nm, 70 nm, 80 nm, 90 nm, 100 nm, 150 nm, 200 nm, 250 nm, 300 nm, 400 nm 500 nm or 600 nm. In some particular aspects, the texture has a periodicity selected from the group consisting of about 15 nanometers, about 30 nanometers, about 60 nanometers, and about 600 nanometers.

Methods of preparing surfaces with such textures are known in the art, and are further provided below. In one aspect, the method entails shrinking a plasma-treated material. In another aspect, the method entails shrinking a metal-coated material. In some aspects, the shrinking is uniaxial.

In one aspect, the method further comprises removing the activated macrophage from the surface. Accordingly, the present disclosure also provides activated macrophages or populations of activated macrophages as prepared with the methods as disclosed herein.

Further, provided are methods for using the activated macrophage to heal a wound, which comprises contacting the activated macrophages with the wound under suitable conditions.

Methods for Preparing Textured Surfaces with Plasma-Treated Material

One embodiment of the present disclosure provides a method for preparing a textured surface, comprising shrinking a thermoplastic material, thereby preparing a textured surface on the material, wherein the material has been treated by a plasma before the shrinking Examples of thermoplastic materials are disclosed above.

Plasmas can be prepared with methods known in the art and can vary depending on availability of sources. In one embodiment, the plasma is oxygen plasma, helium plasma, or hydrogen plasma. In a particular embodiment, the plasma is oxygen plasma.

The duration of plasma treatment can vary and depend on the desired scale of the texture and/or the thermoplastic material, for instance. In one aspect, the plasma treatment takes more than about 10 seconds, or alternatively more than about 20 seconds, about 30 seconds, about 1 minute, about 2 minutes, about 3 minutes, about 4 minutes, about 5 minutes, about 7 minutes, about 10 minutes, about 15 minutes, about 20 minutes, about 25 minutes, or about 30 minutes. In another aspect, the plasma treatment takes less than about 60 minutes, or alternatively less than about 45 minutes, about 30 minutes, about 25 minutes, about 20 minutes, about 15 minutes, about 10 minutes, about 7 minutes, about 5 minutes, about 4 minutes, about 3 minutes, about 2 minutes, about 1 minute, about 30 seconds, or about 20 seconds. In some aspects, the treatment is carried out in a closed chamber. In some aspects, the treatment is carried out in a handheld corona discharger.

The thermoplastic material can be pre-stressed prior to the plasma treatment. In such a case, the shrinking can be achieved by removing the stress. Such a stress can simply be stretching, either uniaxially or biaxially.

Alternatively, the shrinking can be achieved by heating the material. Depending on the material and desired scale of texture, the temperature can vary. In one aspect, the heating is at least about 200° F., or at least about 250° F., or at least about 275° F., or at least about 300° F., or at least about 350° F.

Shrinking of the material can be uniaxial or biaxial. When the material is shrunk uniaxially, the texture may be one dimensional. When the material is shrunk biaxially, the texture may be two dimensional.

In some embodiments, the material is shrunk, uniaxially or biaxially, by at least about 60%, or alternatively at least about 70%, about 75%, about 80%, about 85%, about 90%, about 91%, about 92%, about 93%, about 94%, about 95%, about 96%, about 97%, about 98%, or about 99% from its original size.

Other Methods of Preparing Nanowrinkles

In some embodiments, the preparation of the textured surface comprises the steps of: a) depositing a metal onto a pre-stressed thermoplastic material; b) reducing the surface area of the receptive material by at least about 60%; and c) preparing the surface via lithography.

Steps a) and b) prepare a metal wrinkled surface on the pre-stressed thermoplastic material. Methods for preparing the metal wrinkled surface can be found in PCT Patent Application No. PCT/US2008/1083283, which is incorporated by reference in its entirety.

In some embodiments, the pre-stressed thermoplastic material is a heat sensitive thermoplastic receptive material. In certain embodiments, the depositing of heat sensitive thermoplastic receptive material is by evaporating, which is a physical vapor deposition method to deposit a thin film of metal on the surface of a substrate. By heating a metal in a vacuum chamber to a hot enough temperature, the vapor pressure of the metal becomes significant and the metal evaporated. It recondenses on the target substrate. The height of the metal is dependent on length of processing time. The thermoplastic substrate must be far enough from the source such that the plastic does not heat up during deposition.

After the metal is deposited on the thermoplastic, it is placed in an oven, or similar device, to be heated, and upon heating, because of the stiffness incompatibility between the metal and the shrinking thermoplastic, wrinkles form. The spacing between the metal wrinkles can be controlled by the amount of heating, and hence shrinkage.

Wrinkle height can be controlled by adjusting the metal film thickness. FIG. 17 of the PCT application PCT/US2008/1083283 shows a plot of the maximum average wrinkle height as a function of metal layer thickness. Therefore, one can easily predict the spacing between and height of the metal wrinkles by adjusting the thickness of metal deposited onto the thermoplastic material and the time the thermoplastic material is heated. The thickness of metal deposited onto the thermoplastic material can be easily controlled using the metal deposition methods disclosed herein by adjusting parameters such as time, temperature, and the like. Such methods are well known to one of skill in the art.

Various heights can be achieved from about 2 nanometers to about 100 nanometers. In an particular embodiment, the height of the metal is about 2 nanometers. In an alternative embodiment, the height of the metal is about 5 nanometers, or alternatively, about 10 nanometers, or alternatively, about 20 nanometers, or alternatively, about 30 nanometers, or alternatively, about 40 nanometers, or alternatively, about 50 nanometers, or alternatively, about 60 nanometers, or alternatively, about 70 nanometers, or alternatively, about 80 nanometers, or alternatively, about 90 nanometers, or alternatively, about 100 nanometers.

In some embodiments, wrinkle heights can be achieved from about 100 nanometers to about 5 micrometers. In a particular embodiment, the height of the metal is about 200 nanometers. In an alternative embodiment, the height of the metal is about 200 nanometers, or alternatively, about 300 nanometers, or alternatively, about 500 nanometers, or alternatively, about 700 nanometers, or alternatively, about 1 micrometer, or alternatively, about 2 micrometers, or alternatively, about 3 micrometers, or alternatively, about 4 micrometers, or alternatively, less than about 5 micrometers.

In addition, the directionality of the wrinkles is controlled by grooving the substrate prior to metal deposition. Alternatively, the directionality of the wrinkles can be controlled by monodirectional shrinking using a uni-axially biasing thermoplastic receptive material. In one embodiment, the method to prepare a textured metal surface further comprises first heating a heat sensitive thermoplastic receptive material under conditions that reduce the size of the thermoplastic receptive material bi-axially by at least about 60%, followed by uni-axially biasing the thermoplastic receptive material to shrink along one axis or dimension prior to depositing a metal onto a heat sensitive thermoplastic receptive material, and reducing the material by at least about 60%, thereby preparing a textured metal surface.

In one aspect, the size of the textured metal surface is substantially the same as the thermoplastic receptive material before the receptive material was uni-axially biased. In one embodiment, the thermoplastic receptive material is uni-axially biased using heat.

It is contemplated that any metal can be deposited onto the thermoplastic receptive material to fabricate the metal wrinkles disclosed herein. In some embodiments, the metal is at least one of silver, gold or copper. Depending on the intended use of the metal surface, it may be desired that the metal be deposited in a given pattern or design. The metal can be deposited to only a desired area of the thermoplastic receptive material to form isolated metal sections or 'islands' on the thermoplastic receptive material. Methods for the controlled deposition of metals are well known in the art.

The periodicity of the wrinkle as the wavelength of the wrinkles scale according to the thickness to the 314th power. Therefore, tighter wrinkles are achieved by changing the thickness, or height of the metal layer.

It is contemplated that any thermoplastic material can be used in the methods disclosed herein. In one aspect of the disclosed invention, the thermoplastic materials are those which shrink uniformly without substantial distortion. Suitable thermoplastic materials for inclusion in the methods of this invention include, for example, high molecular weight polymers such as acrylonitrile butadiene styrene (ABS), acrylic, Poly(methyl methacrylate) (PMMA), celluloid, cellulose acetate, ethylene-vinyl acetate (EVA), ethylene vinyl alcohol (EVAL), fluoroplastics (PTFEs, including FEP, PFA, CTFE, ECTFE, ETFE), ionomers kydex, a trademarked acrylic/PVC alloy, liquid crystal polymer (LCP), polyacetal (POM or Acetal), polyacrylates (Acrylic), polyacrylonitrile (PAN or Acrylonitrile), polyamide (PA or Nylon), polyamide-imide (PAI), polyaryletherketone (PAEK or Ketone), polybutadiene (PBD), polybutylene (PB), polybutylene terephthalate (PBT), polyethylene terephthalate (PET), Polycyclohexylene Dimethylene Terephthalate (PCT), polycarbonate (PC), polyhydroxyalkanoates (PHAs), polyketone (PK), polyester polyethylene (PE), polyetheretherketone (PEEK), polyetherimide (PEI), polyethersulfone (PES), polysulfone polyethylenechlorinates (PEC), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polyvinyl chloride (PVC), polyvinylidene chloride (PVDC), polyolefin, and spectralon. In one embodiment, the thermoplastic material is polystyrene.

Alternative embodiments of the methods include, but are not limited to the application of heat to reduce the size of the thermoplastic receptive material by at least 65%, or alternatively, at least 70%, or alternatively, at least 75%, or alternatively, at least 80%, or alternatively, at least 85%, or alternatively, at least 90%.

Thus in some embodiments, the pre-stressed thermoplastic material is biaxially biased. In some embodiments, the pre-stressed thermoplastic material is uniaxially biased.

In some embodiments, the metal is deposited by sputter coating, evaporation or chemical vapor deposition.

In some embodiments, the pre-stressed thermoplastic material is reduced to achieve a surface texture having a periodicity in the range of from about 10 nanometers to about 5 micrometers.

In some embodiments, the pre-stressed thermoplastic material is reduced to achieve a surface texture having a periodicity in the range of from about 10 nanometers to about 600 nanometers. In one aspect, the pre-stressed thermoplastic material is reduced to achieve a surface texture having a periodicity in the range of from about 15 nanometers to about 100 nanometers. In yet another aspect, the pre-stressed thermoplastic material is reduced to achieve a surface texture having a periodicity selected from the group consisting of about 15 nanometers, about 30 nanometers, about 60 nanometers, and about 600 nanometers.

In some embodiments, the metal is deposited in a desired pattern.

In some embodiments, the heat sensitive thermoplastic material is reduced by heating. In some embodiments, the temperature used to heat and reduce the size of the thermoplastic material is from about 100° C. to about 250° C., or alternatively from about 120° C. to about 220° C., or alternatively from about 150° C. to about 200°, or alternatively from about 180° C. to about 190° C., or alternatively about 185° C.

In one aspect, the lithography of step c) comprises soft lithography or imprint lithography.

In one aspect, the lithography of step c) uses a thermoplastic material. In another aspect, the material is selected from the group consisting of polydimethylsiloxane, gelatin, agrose, polyethylene glycol, cellulose nitrate, polyacrylamide, and chitosan.

In one aspect, the material used in lithography, such as PDMS, is poured onto the textured metal surface, which serves as the mold, as in typical soft lithography, and cured at 110° Celsius for 10 minutes. The cured PDMS device is then peeled off the mold and bonded using a hand-held corona discharger (Haubert et al. (2006) Lab Chip Technical Note 6: 1548-1 549). The whole process from device design conception to working device can be completed within minutes.

In some embodiments, to induce the formation of cell growth or alignment, the textured surface of the thermoplastic material, such as PDMS, can be soaked in polar and non-polar solvents such as pentane for 12 hours, followed by a solvent change where new pentane is added and is further soaked for 12 hours, next the pentane solvent is replaced with xylene for 7 hours and is replaced with new xylene for another 12 hours, last the microwells are soaked in ethanol for 12 hours prior to use. To simplify the protocol and save time, the first solvent is generally used to swell PDMS as much as possible, then followed by de-swelling gradually. Solvents that swelled PDMS the least: water, nitromethane, dimethyl sulfoxide, ethylene glycol, perfluorotributylamine, perfluorodecalin, acetonitrile, and propylene carbonate. Solvents that swelled PDMS the most: diisopropylamine, triethylamine, pentane, and xylenes. For an example of swelling and de-swelling procedure, soak in pentane for 24 hours; pentane 7 hours; then xylene isomers plus ethylbenzene 98.5% 1-2 hours; then xylenes for 16 hours; xylenes for 7 hours; then EtOH 1-2 hours, then EtOH again for 16 hours, and finally EtOH for 7 hours. Then soak in about 1 L of sterile DI water overnight and dry at 70° C. overnight.

Devices and Methods

The methods disclosed herein are capable of fabricating various devices to be used in applications such as molecular detection, optical devices, filters and sorters, high-surface area conductors and actuators, molecular detection, optical devices, filters and sorters, high-surface area conductors and actuators, metrology, surface-enhanced Raman scattering (SERS), metal-enhanced fluorescence (MEF), and extraordinary light transmission. Exploitation of these and other plasmon-induced effects have benefited numerous applications, including near-field optical microscopy, sub-wavelength photonics, biochemical sensing and solar energy harvesting.

One non-limiting example of such applications is cell culture. Use of textured surfaces, including those prepared by shrinking a pre-stressed surface, is known in the art, see, for example, WO/2010/085751 and WO/2010/108025, the contents of which are incorporated into the present disclosure by reference in their entirety. Other exemplary applications include isolation, purification, modification or processing of DNA or RNA samples. In some aspects, the textured surface is coated with silica.

Texture surfaces prepared by the methods of the present disclosure can also be used as mold for creating hydrophobicity in polymers resultant from the molded high surface area structures being embossed or otherwise applied to the polymer. As nano-scaled textured surfaces are useful in biosensing (see, e.g., WO/2010/132610, the content of which is incorporated into the present disclosure by reference in its entirety), it is further contemplated that devices or textured surfaces prepared by the methods of the present disclosure are used to enhance sensing of biological molecules or samples.

Thus, this disclosure also provides a device having a textured surface prepared by a method of the present disclosure and a method of using such surfaces as described above.

EXPERIMENTAL EXAMPLES

Example 1

Figure 1:
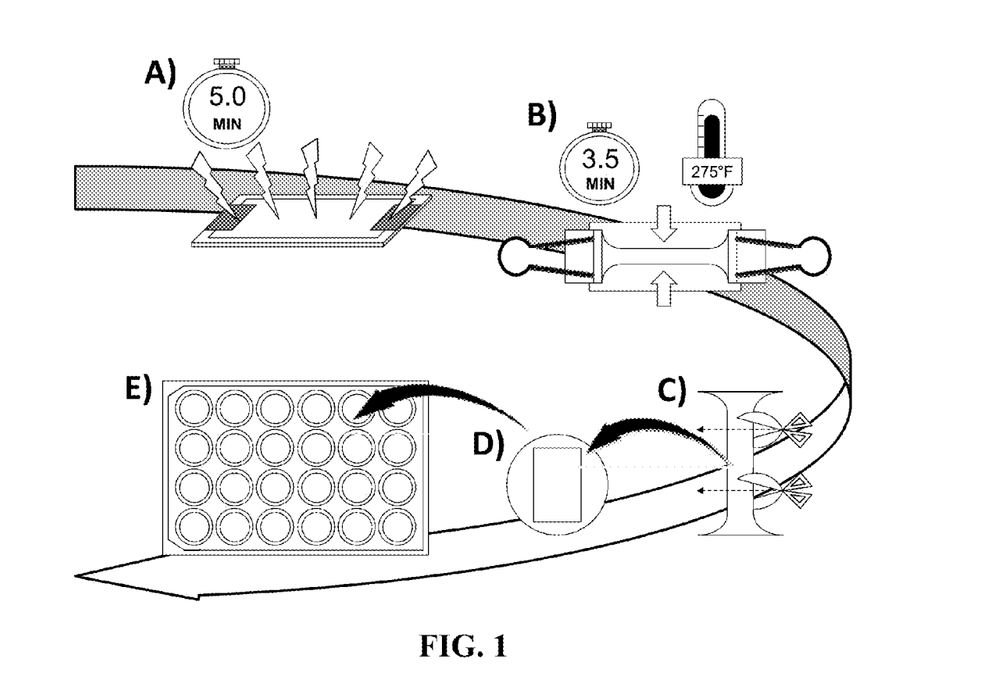

This example illustrates preparation of a textured surface with the present technology. With reference to FIG. 1, at step (A) a Poly olefin (PO) film was treated with oxygen plasma for 5 minutes. Subsequently, the treated film was constrained on opposite sides by using binder clips and was heated at 275° F. for 3.5 minutes to induce the formation of wrinkles (B). Then the wrinkled substrate was trimmed (C) to a suitable size (D) and glued onto a glass coverslip (E).

Figure 2:
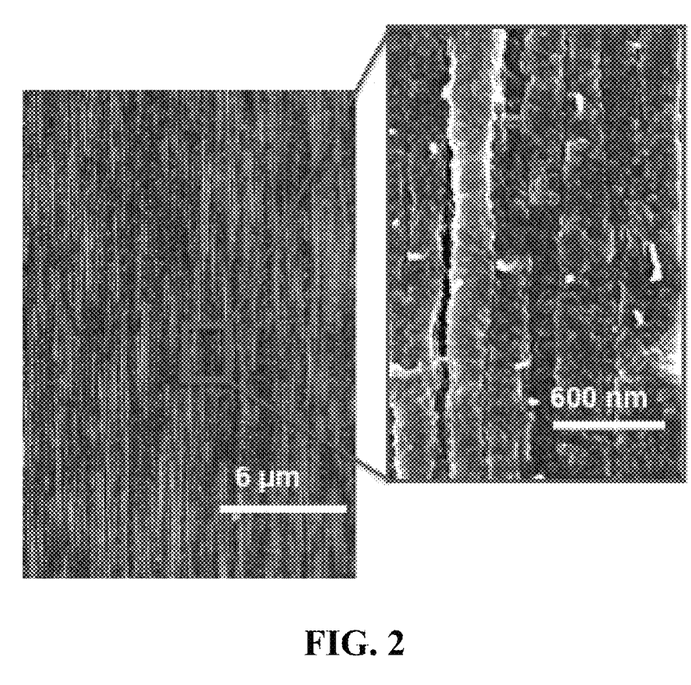
FIG. 2 shows microscopic pictures of the a textured surface prepared by the method of present disclosure.

FIG. 2 shows microscopic pictures of the textured surface prepared by the method of the present technology.

Example 2

This example shows that the textured surface prepared by the methods of the present disclosure is useful in aligning stem cells.

Using this unique self-assembled multi-scaled topographical substrate prepared by the method, the effect of contact guidance on both hESC and human embryoid body (hEB) morphology and cytoskeleton organization was studied. Responses of hESCs to grooved topography were quantified and demonstrated from 0.5 to 72 hours and showed that the cells and their nuclei were robustly aligned within 2 hours. Additionally, the alignment of hEBs to the grooved topography within 24 hours was demonstrated. Understanding the effect of contact guidance on the cells could potentially lead to the direct differentiation into specific lineages.

Methods and Materials
Fabrication of Wrinkled Substrate

Wrinkled substrates were fabricated from PE films (Cryovac° D-film, LD935, Sealed Air Corporation). PE film, cut into a 1.5" by 3" strip, was placed lengthwise onto a glass slide. The film was treated with oxygen plasma (Plasma Prep II, SPI Supplies) for 1, 5, or 15 minutes. After plasma treatment, PE piece was constrained on opposite sides with binder clips (2" binder clips; OfficeMax), and was thermally shrunk at 150° C. for 3 minutes to generate aligned wrinkles The PE wrinkled film was trimmed and mounted to a 12 mm glass coverslip (wrinkled substrate) for cellular plating. Wrinkled substrates were sterilized by immersing in 70% ethanol and under UV light for 30 minutes inside a bio-safety cabinet.

Characterization of Wrinkles

To characterize the wrinkles, scanning electron microscopy (SEM), atomic force microscopy (AFM), and X-ray Photoelectron Spectroscopy (XPS) were performed. For the SEM, wrinkled substrates were sputter coated (Polaron SC7620) with 3 nm gold/palladium. Scanning electron micrographs (SEM) were obtained on each wrinkled substrate with 1K, 5K, 10K, and 20K magnifications, 10 kV beam, and 12 mm working distance (Hitachi S-4700-2 FE-SEM Scanning Electron Microscope). Images were analyzed by fast Fourier transform using a MATLAB (MathWorks Inc., Natick, Mass., USA) code developed in-house. AFM was conducted on a MFP-3D inverted optical microscope (Asylum Research, Santa Barbara, Calif.). The topographic of images of the 1, 5, and 15 minute plasma treatment substrates were taken in tapping mode. Silicon tips having a resonant frequency of about 75 kHz and force constant of 3 N/m were used. The software used for data acquisition and analysis was IGOR Pro 6.0 (Wavemetrics, Portland, Oreg.). XPS (SSI S-Probe XPS Spectrometer, Stanford Nanocharacterization Laboratory) was performed to acquire elemental compositions on the surface of various samples. Samples of pre-shrunk, post-shrunk, and plasma post-shrunk were analyzed by loading into the XPS Spectrometer to confirm oxidation of the surface.

Aotic Smooth Muscle Cell (AoSMC) and Mouse Embryonic Fibroblast (MEF) Culture

AoSMCs were maintained on tissue culture plates without protein coating. AoSMC medium consisted of SmBM (CC-3181, Lonza) and SmGM-2 (CC-4149, Lonza). Medium was exchanged every 2 to 3 days, and cells were passaged when reached 80 to 90% confluence.

Growth arrested MEFs (inactivated MEFs) (ASF-1217, Applied Stem Cell) were maintained on tissue culture plates coated with 0.1% porcine gelatin (G1890, SigmaAldrich). MEF medium consisted of Dulbecco's Modified Eagle Medium (D-MEM) High Glucose (11960-044, Invitrogen) supplemented with 10% fetal bovine serum (FBS) (SH30071.03, Hyclone) and 2 mM Glutamax (35050079, Invitrogen). For hESC conditioned medium, T-175 $cm^2$ tissue culture flasks (1012661LC, Fisher Scientific) were coated with 0.1% porcine gelatin and seeded with inactivated MEFs at a density of $5\times10^6$ cells per flask in MEF medium. MEFs were allowed to attach overnight prior to exchange with hESC medium which is described below. For feeder-dependent culture, inactivated MEFs were plated onto 6-well culture plates coated with 0.1% porcine gelatin at a density of $2.5\times10^5$ cells per well and allowed to attach overnight prior to addition of hESC colonies.

Human Embryonic Stem Cell (hESC) Culture

Maintenance of hESCs was described in Thomson et al., Science 282 (5391):1145 (1998). Briefly, feeder-dependent H9 hESCs were co-cultured with inactivated MEFs on tissue culture plates coated with 0.1% porcine gelatin. Feeder-dependent hESC medium consisted of Knockout Dulbecco's Modified Eagle Medium (10828-018, Invitrogen) supplemented with 20% Knockout Serum Replacer (10828-028, Invitrogen), 100 µM β-mercaptoethanol (M7522, SigmaAldrich), 100 µM non-essential amino acids (11140-050, Invitrogen), 2 mM Glutamax (35050079, Invitrogen), and 4 ng/mL human recombinant fibroblast growth factor basic (bFGF) (233FB025, R&D Systems). For feeder-independent culture, H9 hESCs were cultured on tissue culture plates coated with Matrigel® (356230, BD Biosciences). Feeder-independent hESC medium was composed of hESC conditioned medium with an additional 4 ng/mL bFGF. For both culture types, medium was exchanged daily, and cells were passaged once they reached 80 to 90% confluence.

Cell Alignment

In the AoSMC and MEF alignment study, cells were loaded onto wrinkled substrates, coated with Matrigel® and placed inside a 24-well plate, at a density of $5\times10^4$ cells per well. End-point cell staining was performed at 24 hours.

The feeder-independent hESC alignment study first required that the wrinkled substrates be coated in Matrigel® for a minimum of 24 hours. The cell loading density was $5\times10^4$ cells per well. Daily exchange of hESC conditioned medium was required for culturing the cells. End-point cell staining was performed at nine time points: 0.5, 1, 1.5, 2, 4, 6, 12, 24, and 72 hours. Confocal micrographs (Laser Scanning Microscopy 710, Zeiss) were taken on all samples from each time point for further image analysis.

Cell Staining

Cells were first rinsed with 1× phosphate-buffered saline (1×PBS) (70013-032, Invitrogen) and then fixed for 10 minutes at 37° C. The fixative consisted of 1×PBS, 4% paraformaldehyde (158127, SigmaAldrich), 0.5% magnesium chloride (M8266, SigmaAldrich), 2% 0.5M ethylene glycol-bis (2-aminoethylether)-N,N,N',N'-tetraacetic acid (EGTA) (E3889, SigmaAldrich), and 4% sucrose (S9378, SigmaAldrich). After fixing, cells were rinsed with 1×PBS and permeabilized with 1×PBS and 0.3% Triton® X-100 (T9284, SigmaAldrich) solution for 5 minutes. Cells were rinsed with 1×PBS again and blocked with 1×PBS and 5% bovine serum albumin (BSA) (A7906, SigmaAldrich) for 2 hours at room temperature. F-actin and nuclei were stained by using rhodamine phalloidin (R415, Invitrogen) and 4',6-diamidino-2-phenylindole (DAPI) (D3571, Invitrogen), respectively.

Flow Cytometry Analysis

Flow cytometry was performed to detect the expression of pluripotent markers in feeder-independent culture. Briefly, hESCs were fixed in the fixative previously mentioned on ice for 15 minutes. Next, cells were spun down at 1,000 RPM for 5 minutes and resuspended in 0.3% Triton® X-100 for 10 minutes on ice. After permeabilization, cells were stained with anti-Oct-3/4 conjugated with phycoerythrin (560186, BD), anti-Sox2 conjugated with Alexa Fluor 647 (560302, BD), and anti-Nanog conjugated with Alexa Fluor 488 (560791, BD) for 30 minutes on ice. Next, cells were then spun down at 1,000 RPM for 5 minutes and resuspended in PBS without calcium and magnesium and the rinsing process was repeated. Flow cytometry (FACSCalibur, BD) was performed and data was analyzed using FlowJo (Tree Star, Oreg.) software.

Image Analysis

Images were processed to quantify the distribution of orientations using custom scripts written in MATLAB. Images of labeled actin were filtered to estimate the image gradient at each pixel location using a Gaussian derivative (sigma=2 pixels). The distribution of orientations was estimated by computing a histogram of gradient orientations where the contribution of each pixel was weighted by the gradient magnitude. This weighting limited the contribution of pixels in low contrast regions of the image where gradient orientation estimate was uncertain. The orientation histogram was computed for n=12 disjoint 300×300 pixel subwindows in each image and the standard deviation computed across the subwindows. An independent measurement of cell alignment with the wrinkle substrate was computed by detecting DAPI labeled nuclei and estimating the orientation of the major axis of each nucleus. Nuclei were segmented by thresholding followed by morphological processing and watershed segmentation to separate overlapping nuclei. The orientation of each segmented nucleus was estimated by computing the moment matrix of the segment and identifying the major and minor axes. Elongation of the nuclei was computed as the ratio of the lengths of the major and minor axes. Nuclear area and perimeter were also calculated using the same code. Circularity was calculated using the following formula:

$$C = \frac{4\pi A}{P^2}.$$

where A and P are the nuclear area and perimeter, respectively. Circularity is a dimensionless number that measures the ratio between the area of sample and the area of a circle with the same perimeter as the sample. An elongated shape will have circularity less than 1. Furthermore, the closer the value to 0 the more extended and narrow the shape is.

Statistics

All cell culture experiments were conducted in duplicate and three independent experiments (n=6 substrates). Image analysis was performed on three images per time point per experiment (n=9 images per time point). For nuclear alignment and deformation, at least 300 nuclei were analyzed per time point. All bar graphs were reported as mean±s.d. Lilliefors' test for normality was performed to determine distribution of data. Two-tailed student's t-test with unequal variance was used for calculating statistical significance between treatments (Microsoft Excel, Redmond, Wash.). Significance levels were set at *$p<0.001$ and **$p<0.01$.

Results

Figure 3:
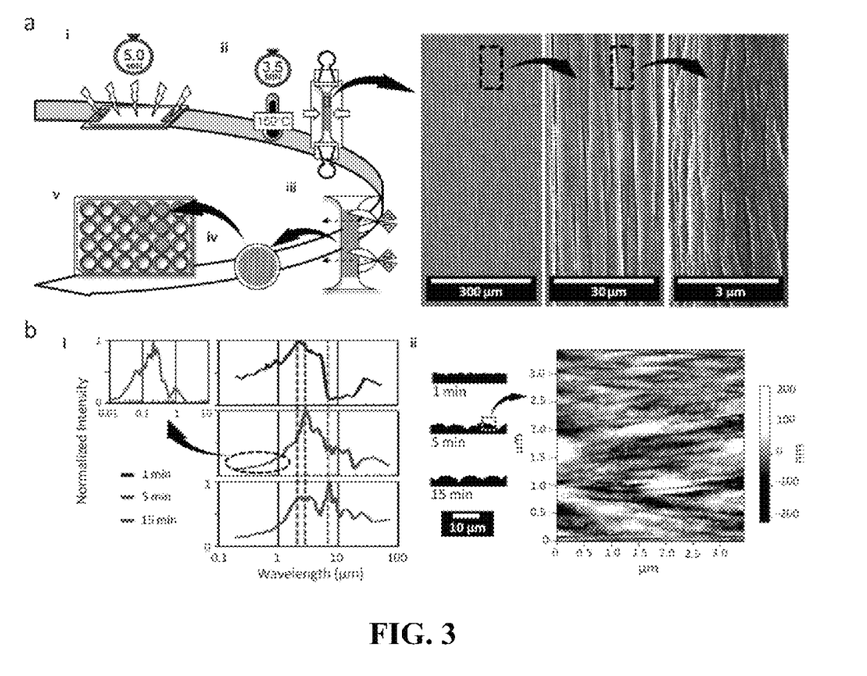
FIG. 3a illustrates the process flow of shrink-film wrinkle formation. (i) PE film is treated with oxygen plasma for 5 minutes (P5). (ii) PE film is constrained on opposite sides and thermally shrunk to create unidirectional wrinkles SEMs with progressive zooms of 100×, 1,000×, and 10,000× illustrating the self-similar wrinkles for P5 condition. The bundling of the wrinkles is apparent. (iii) Shrunk PE film is cut into desired dimension and (iv) mounted onto a glass coverslip (v) to be used in cell culture experiment.
FIG. 3b shows features of formed shrink-film wrinkles (i) Feature scale distribution estimated from the Fourier transform of SEM images for the three different plasma conditions. Inset shows the smaller population of wrinkles at 20,000×, not resolvable at the lower SEM magnification. (ii) Cross sections indicate bundling as confirmed by the inset AFM showing the height range of the wrinkles.
Figure 5:
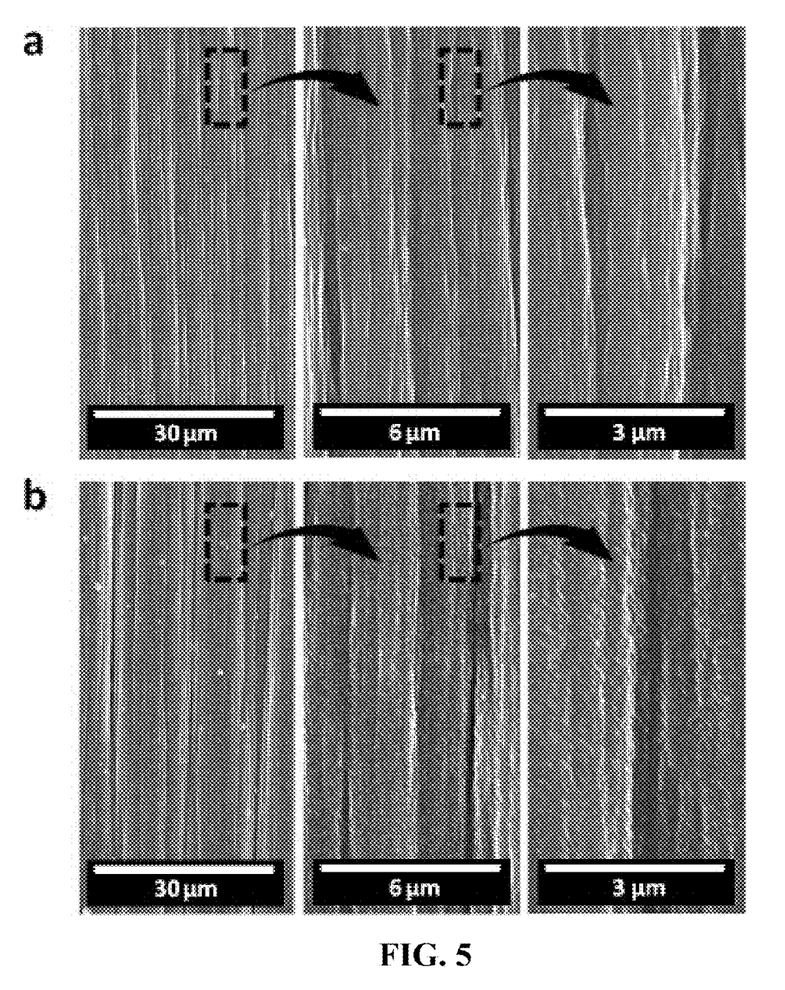
Figure 6:
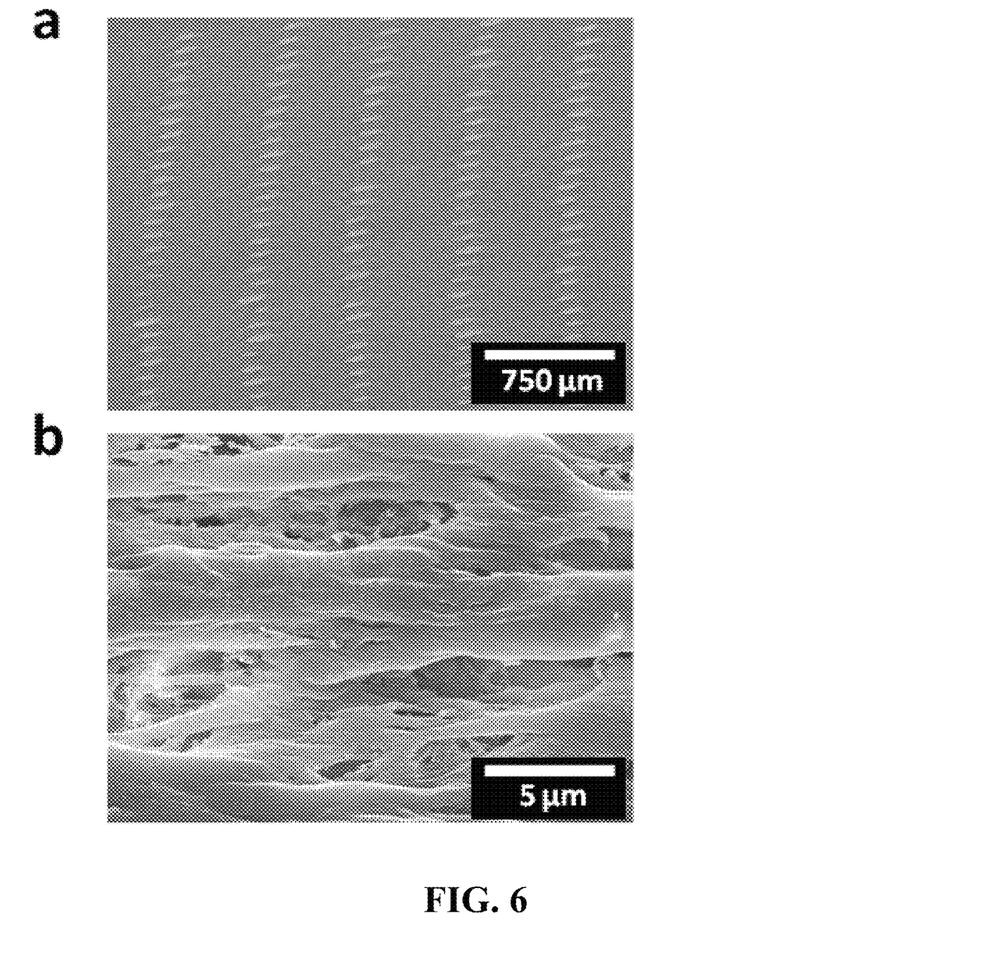
FIG. 6a shows discrete uniaxial wrinkled islands. The islands are around 150 μm long and 40 μm wide.
FIG. 6b shows unisaxial wrinkled features created from porous PE film.

Commodity shrink film, pre-stressed polyethylene (PE) (0.5 mil gauge), is oxidized, and subsequently shrunk uniaxially to create aligned grooves or 'wrinkles' over large areas difficult to achieve with other approaches such as e-beam lithography or nano-imprint lithography. Oxidation is achieved by oxygen plasma treatment, which creates a thin and relatively stiff layer at the surface of bulk PE film. Leveraging the inherent refraction properties of the pre-stressed film, which shrinks uniaxially by 90% by heating briefly to 150° C., this mismatch in stiffness causes the stiff outer oxidized layer to buckle and form predictably controllable distributions of nano and micro wrinkles (FIG. 3). The properties of the aligned wrinkles can be controlled through plasma treatment time (FIG. 3b). Interestingly, self-similar wrinkles form across various length scales with bundling of the wrinkles apparent at longer oxidation times. The formation of aligned hierarchical grooves is due to different generations of effective layers that are thicker and stiffer than the previous layer. Upon shrinking, the first generation of wrinkles and a new effective layer form. Further shrinking induces formation of a new generation of wrinkles until the shrinking process is complete. This process forms multi-scale grooves as each successive generation of wrinkles form with wavelengths similar to the hierarchal structuring of collagen bands. As apparent from the graph, and confirmed by the cross-sectional images and atomic force microscopy (AFM) measurements (FIG. 3b), a nested hierarchy is apparent at the 5 and 15 minute plasma times, with distinct size populations. The distribution of wrinkles is controllable, with larger wrinkle sizes becoming more dominant with increased plasma time, in agreement with the present theoretical model based on skin thickness (FIG. 5). These wrinkles can be patterned for discrete 'wrinkle islands' or made from porous shrink film as well (FIG. 6). Complete fabrication of the topographical substrate takes less than 10 minutes.

To demonstrate the effectiveness of these biomimetic wrinkles, human embryonic stem cells (hESCs) were aligned. Recent findings indicate that lineage commitment in human mesenchymal stem cells can be altered by cell shape. Although ESCs do not have the stable tissue-specific stem cell niche of adult stem cells, studies suggest that their ability to self-renew or differentiate is similarly regulated via interactions with their microenvironment. Therefore, mimicking stem cell niches in culture systems may hold the potential to facilitate controlled differentiation. The wrinkles can be directly coated with ECM for cell culture or, alternatively, used as a mold for various tissue engineering biodegradable polymers. Using this unique self-assembled multi-scaled topographical substrate, the effects of contact guidance on hESC morphology at sub-cellular resolution is studied.

Figure 4:
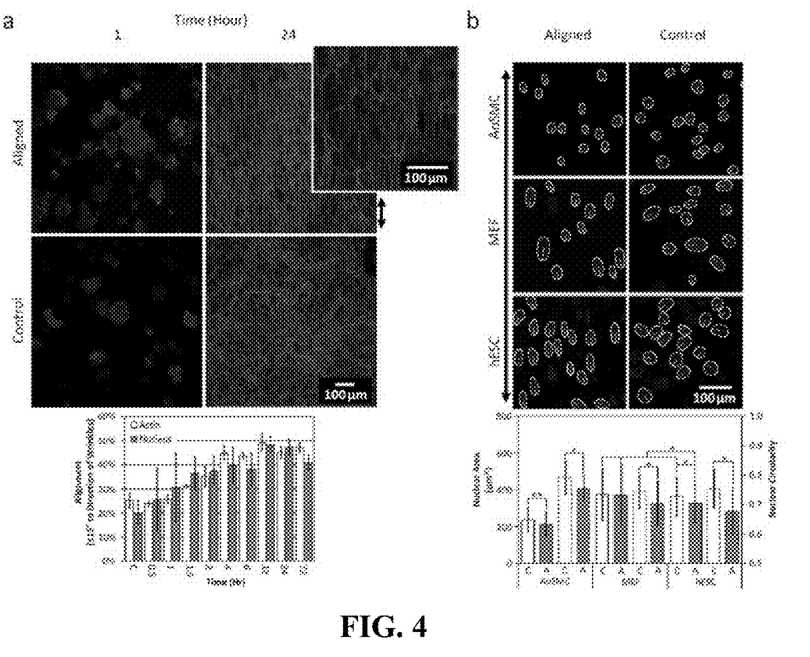
Figure 7:
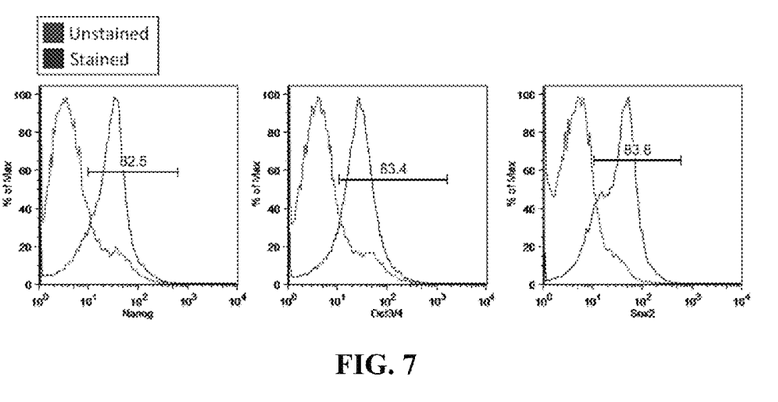
FIG. 7 use flow cytometry data to show more than 80% of hESCs expressed pluripotent markers: Oct4, Sox2, and Nanog, on culture day 0. The cell counts for unstained and stained samples were 21,750 and 45,720 cells, respectively.

While there has been a report that hESCs align to 600 nm grooves in the presence of differentiation media, it is demonstrated here for the first time the sub-cellular time-lapse response to topography of feeder-free pluripotent hESCs without soluble differentiation factors (FIG. 7). Alignment was assessed based on f-actin and nuclear alignment (FIG. 4). Time lapse imaging of the cells indicate that the majority of cells align to the wrinkles within the first 4 hours of plating, with more than 40% of the cells stably aligning to within 15° of the wrinkle direction (FIG. 4a). As a point of comparison, to achieve roughly the same degree of alignment by flow with endothelial cells requires 1.5 Pa shear stress for 10 hours. The hESC nuclei are also more aligned compared to a study of fibroblast nuclei on 12.5×2 µm micro-grooved topography at 24 hours culture time.

Notably, it is demonstrate herein for the first time the deformation of pluripotent hESC nuclei due to topography. The deformed nuclei of hESCs exhibit a decreased surface area, in agreement with topography-induced direct mechanotransduction. The nuclei of undifferentiated stem cells are more plastic than those of differentiated cells and change as a function of differentiation. The highly compliant nuclei of hESCs were revealed through the measurements of nuclear area and circularity as compared to other cell types including aotic smooth muscle cells (AoSMCs) and mouse embryonic fibroblasts (MEF) (FIG. 4b). The hESCs exhibit both a decreased projected area as well as a decreased circularity in response to the alignment; this is in stark contrast to MEF, where nuclei circularity are statistically altered by the wrinkles but their projected area are not affected. As apparent from the graphs, AoSMC nuclei do deform, but to a lesser degree than the more plastic undifferentiated hESC nuclei.

Understanding how the cell perceives topographical cues and translates that information to the nucleus to commence mechanotransductive signaling could enable a strategy of controlled stem cell differentiation without the need for either invasive stimuli or chemical inducement with defined media. Importantly, because the multi-scale topography inherent to this substrate is easily tuned by plasma treatment time, it is possible to map the effect of local topography on sub-cellular responses. This would allow, for example, the role of each length scale in contact guidance to be elucidated. Because comparatively little is yet understood with respect to the effects of hESC alignment on differentiation, it is important and now practical to test the range of physiologically relevant cues in a comprehensive format reflective of the multi-scales typical of in-vivo substrata.

The alignment of pluripotent hESCs is an example of how this substrate can be used to rapidly and easily perform otherwise challenging biological studies. The ability to controllably affect contact guidance of hESCs could elucidate critical molecular pathways and lead to directed differentiation into specific lineages. Importantly, such a robust, easy to fabricate and configurable platform (compatible with microtiter plates and spatiotemporal imaging/mapping) could enable ubiquitous alignment of any adherent cell type for various tissue engineering and injury repair applications.

This example therefore introduces an ultra-rapid, tunable, robust, facile, and inexpensive fabrication method to create multi-scaled biomimetic alignment topography with features ranging from nano- to micrometers. Commodity plastic shrink-wrap film is oxidized and subsequently shrunk 90% uniaxially for controlled and predictable aligned grooves or 'wrinkles' within minutes. Time-lapse response of human embryonic stem cells to these grooved topographical features is monitored by cytoskeletal and nuclear alignment as well as altered nuclei shape.

Example 3

Activation of Macrophage on Nanowrinkles

This example tests the use of wrinkled surfaces to control macrophage activation and shows that nanowrinkles can induce would healing response from macrophages.

Figure 8:
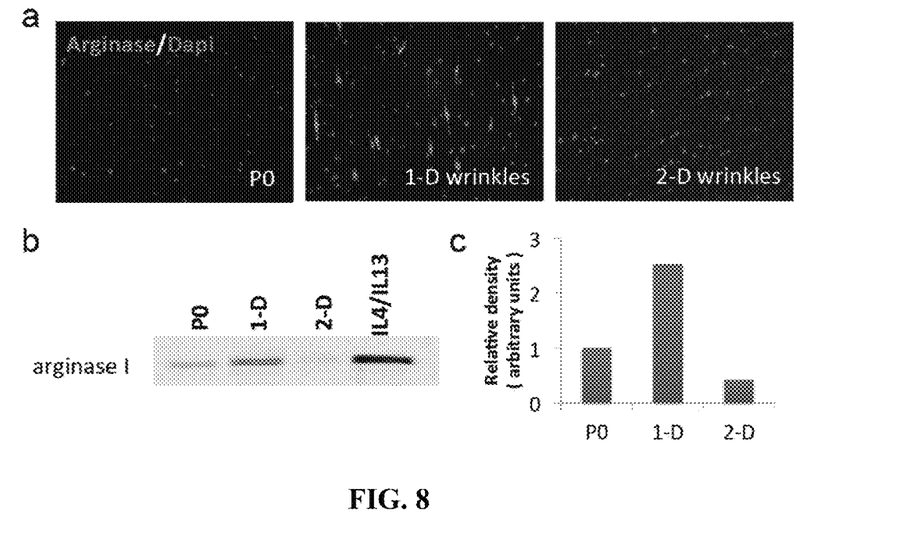

Bone marrow derived macrophage cells were seeded on a plain surface, a one-dimensional wrinkle surface and a two-dimensional wrinkle surface. Preparation of surfaces with one- or two-dimensional wrinkles was as provided in Example 2. The one-dimensional wrinkles ranged from about 50 nm to about 10 µm in width, and the two-dimensional wrinkles ranged from about 100 nm to about 10 µm in width. As shown in FIG. 8, arginase is highly expressed in macrophages seeded on the one-dimensional wrinkles but expressed lowly in those seeded on plain surface or two-dimensional wrinkles Arginase is required for collagen biosynthesis and has been shown to be upregulated in macrophage polarized towards a pro-healing phenotype. For instance, arginase is upregulated by immunosuppressive/pro-healing cytokines IL4/IL13, which activate macrophages under physiological conditions. The upregulation of arginase in macrophages on one-dimensional wrinkles, therefore, demonstrates the activation of the macrophages.

Figure 9:
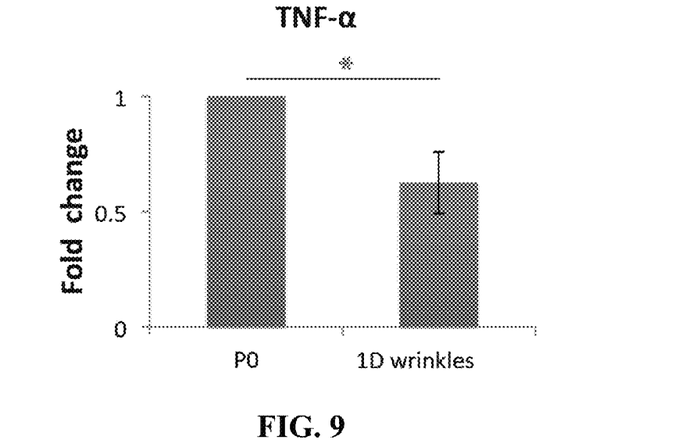
FIG. 9 is a chart showing the effect of wrinkled surfaces on pro-inflammatory cytokine secretion. Bone marrow derived macrophage cells seeded on wrinkled surfaces exhibit reduced secretion of the pro-inflammatory cytokine, tumor necrosis factor-α (TNF-α).
Figure 10:
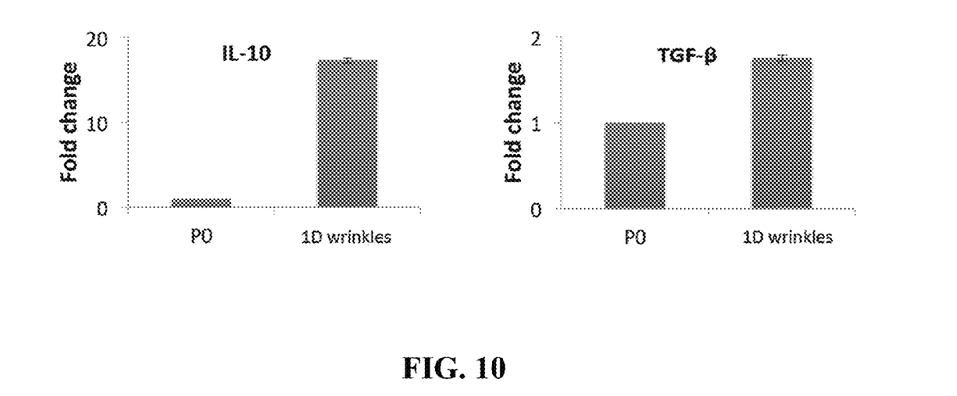
FIG. 10 presents the effect of wrinkled surfaces on pro-healing cytokine secretion. Bone marrow derived macrophage cells seeded on wrinkled surfaces exhibit an increase in secretion of cytokines involved in pro-healing, including IL-10 and TGF-β.

Further, as shown in FIGS. 9 and 10, macrophages seeded on one-dimensional wrinkles also exhibited reduced secretion the pro-inflammatory cytokine, tumor necrosis factor-α (TNF-α), and an increase in secretion of cytokines involved in pro-healing, including IL-10 and TGF-β. Like arginase, these are also indications that the pro-healing functions of macrophages are activated.

In sum, this example shows that, without requiring the addition of exogenous cytokines, nanowrikles are effective in inducing pro-healing functions of macrophages and activating macrophages.

While the present invention is exemplified and illustrated by the use of polystyrene sheets to fabricate channel structures and molds, it would be obvious to those of skill in the art that any thermoplastic receptive material that can be patterned to control the dimensions of the channel defining walls and thereby their size, can be used to fabricate the devices disclosed and claimed herein. In addition, although several other embodiments of the invention are described herein in detail, it will be understood by those skilled in the art that variations may be made thereto without departing from the spirit of the invention or the scope of the appended claims.

The invention claimed is:

1. A method for preparing a textured surface, comprising treating a surface of a shrinkable thermoplastic material with a plasma to increase stiffness of an outer layer of the surface relative to a subsurface layer;
constraining opposite sides of the plasma-treated thermoplastic material;
thermally shrinking the constrained plasma-treated thermoplastic material under conditions to buckle the outer layer to form a layer with nanoscale wrinkles or textures having an average height from about 100 nm to about 5 micrometers above the subsurface layer of the material.

2. The method of claim 1, wherein the plasma is oxygen plasma.

3. The method of claim 1, wherein the material is shrunk by at least 60%.

4. The method of claim 1, wherein the thermoplastic material comprises a high molecular weight polymer, polyolefin, polyethylene, acrylonitrile butadiene styrene (ABS), acrylic, celluloid, cellulose acetate, ethylene-vinyl acetate (EVA), ethylene vinyl alcohol (EVAL), fluoroplastics (PTFEs, including FEP, PFA, CTFE, ECTFE, ETFE), ionomers kydex, a trademarked acrylic/PVC alloy, liquid crystal polymer (LCP), polyacetal (POM or Acetal), polyacrylates (Acrylic), polyacrylonitrile (PAN or Acrylonitrile), polyamide (PA or Nylon), polyamide-imide (PAI), polyaryletherketone (PAEK or Ketone), polybutadiene (PBD), polybutylene (PB), polybutylene terephthalate (PBT), polyethylene terephthalate (PET), Polycyclohexylene Dimethylene Terephthalate (PCT), polycarbonate (PC), polyhydroxyalkanoates (PHAs), polyketone (PK), polyester polyethylene (PE), polyetheretherketone (PEEK), polyetherimide (PEI), polyethersulfone (PES), polysulfone polyethylenechlorinates (PEC), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polyvinyl chloride (PVC), polyvinylidene chloride (PVDC) or spectralon.

5. The method of claim 4, wherein the thermoplastic material comprises polyolefin.

6. The method of claim 4, wherein the thermoplastic material comprises polyethylene.

7. The method of claim 1, wherein the duration of the treating step is about 1 to about 60 minutes.

* * * * *